United States Patent
Kim

(10) Patent No.: US 6,404,415 B1
(45) Date of Patent: Jun. 11, 2002

(54) CONTROL MECHANISM AND METHOD FOR CONTROLLING PARAMETER VALUES AND FOR CONTROLLING A POSITION OF A CURSOR OF A PORTABLE COMPUTER DISPLAY

(75) Inventor: Hyun-Soo Kim, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/417,059

(22) Filed: Oct. 13, 1999

(30) Foreign Application Priority Data

Oct. 13, 1998 (KR) ............................................. 98-42807

(51) Int. Cl.⁷ ................................................ G09G 5/08
(52) U.S. Cl. ....................................... 345/157; 345/168
(58) Field of Search ................................. 345/156, 157, 345/165, 168

(56) References Cited

U.S. PATENT DOCUMENTS

| | | | |
|---|---|---|---|
| 4,464,652 A | | 8/1984 | Lapson |
| 4,712,101 A | * | 12/1987 | Culver ........................ 345/157 |
| 4,724,715 A | * | 2/1988 | Culver ........................ 74/471 R |
| RE32,633 E | | 3/1988 | Hovey et al. |
| 4,896,554 A | * | 1/1990 | Culver ................... 74/471 XY |
| 4,928,093 A | * | 5/1990 | Rahman ...................... 345/157 |
| 4,982,618 A | * | 1/1991 | Culver ...................... 74/471 X |
| 5,126,723 A | * | 6/1992 | Long et al. .................. 345/157 |
| 5,164,712 A | * | 11/1992 | Niitsuma ..................... 345/184 |
| 5,270,690 A | * | 12/1993 | Oberg ......................... 345/163 |
| 5,510,811 A | | 4/1996 | Tobey et al. |
| 5,638,092 A | | 6/1997 | Eng et al. |
| 5,701,140 A | | 12/1997 | Rosenberg et al. |
| 5,704,037 A | | 12/1997 | Chen |
| 5,760,764 A | | 6/1998 | Martinelli |
| 5,808,602 A | | 9/1998 | Sellers |
| 5,821,922 A | | 10/1998 | Sellers |
| 5,880,714 A | | 3/1999 | Rosenberg et al. |
| 5,914,703 A | | 6/1999 | Herng-Chuen |
| 6,307,535 B1 | | 10/2001 | Kim et al. |

FOREIGN PATENT DOCUMENTS

EP          0 353 327      *   8/1988   ............. G06F/3/02

* cited by examiner

*Primary Examiner*—Chanh Nguyen
*Assistant Examiner*—Fritz Alphonse
(74) *Attorney, Agent, or Firm*—Robert E. Bushnell, Esq.

(57) ABSTRACT

A control mechanism, such as for a portable computer, for controlling of a variable or parameter, such as the position of a cursor on a display screen, includes a housing, a frame, a circular bar, a slider, a first mark member, a second mark member, a detecting member and a system unit. The circular bar, coupled to the frame, is capable of rotational movement and movement linearly or longitudinally. The slider is supported by the bar to move linearly or longitudinally together with the bar. The first mark member is provided with the bar and indicates displacement of the bar during rotation of the bar. The second mark member is provided with the slider and indicates displacement of the slider during linear movement of the slider. The first mark member and the second mark member are respectively located within the housing. The rotational movements and linear or longitudinal movements of the handle member and the slider are sensed by the detecting member. The system unit, capable of analyzing the displacement sensed by the detecting member, controls a variable or a parameter, such as a position of a cursor on the display screen of a computer.

17 Claims, 10 Drawing Sheets

CONTROL MECHANISM AND METHOD FOR CONTROLLING PARAMETER VALUES AND FOR CONTROLLING A POSITION OF A CURSOR OF A PORTABLE COMPUTER DISPLAY

CLAIM OF PRIORITY

This application makes reference to, incorporates the same herein, and claims all benefits accruing under 35 U.S.C. §119 from my application A PORTABLE COMPUTER WITH A POINTING DEVICE filed with the Korean Industrial Property Office on Oct. 13, 1998 and there duly assigned Ser. No. 42807/1998.

BACKGROUND OF THE INVENTION

1. Field of the Invention

The present invention relates to a portable computer and, more particularly to a portable computer having a control mechanism for controlling a position of a cursor of a portable computer display.

2. Description of the Related Art

It is well known to use a hand-engageable mouse with a computer keyboard for moving a pointer or cursor on a display screen into various positions on the display for one or more purposes. It has also been known to substitute for the mouse a control mechanism which is used adjacent to the keyboard of the computer for effecting changes in cursor positions by manipulation of movable parts by the fingers or palm of the hand while the fingers of the hand remain on the keys of the computer keyboard.

In a portable computer having a control mechanism exemplary of contemporary practice in the art, control over vertical and horizontal movements of the cursor on a computer display is achieved by the use of a contact portion of a rotatable and freely slidable shaft. The shaft is coupled to a support so that the shaft can be moved longitudinally or rotationally. A first analog value is adjusted by rotation of the contact portion in either direction. A second analog value is adjusted by moving the contact portion along the shaft in either direction. Also, the control mechanism exemplary of contemporary practice in the art can be constructed so that, with a slight downward pressure on the contact portion, an electrical switch can be actuated for enabling a circuit of the apparatus with which the control mechanism is associated.

In accordance with the aforementioned control mechanism exemplary of contemporary practice in the art, sensing members detecting a movement of the slidable and rotational contact portion are affixed on the shaft. Generally, the sensing members are directly printed on the shaft or on another printed film that is affixed on the shaft. For example, a line of one sensing member is provided vertically, and a line of another sensing member is provided horizontally. The movement of the shaft causes a position of one or both of the sensing members to change, which produces an analog value about a position of the contact portion. A system unit, located within the portable computer receives the analog value and controls the position of a cursor on the display screen. Therefore, the sensing members are always exposed to the outside, which can result in a low efficiency or a failure of the control mechanism exemplary of contemporary practice in the art when used.

U.S. Pat. No. 4,464,652 to Lapson, et al. entitled Cursor Control Device For Use With Display Systems, disclose a cursor control device having application to a computer display system that includes a unitary frame, having a domed portion substantially surrounding and retaining a ball which is free to rotate. X-Y position indicating means are provided, such that rotation of the ball provides signals indicative of X-Y positions on the display system. X-Y positions are established by movement of the control device over a surface.

U.S. Pat. No. 5,510,811 to Tobey, et al. entitled Apparatus And Method For Controlling Cursor Movement, disclose an apparatus and method for navigating through an application program on a computer coupled to a computer-controlled display screen. The user can control the cursor position on the computer-controlled display using a hand-held controller with a four direction control button and a function select button. The computer accepts the direction input information and moves the cursor or the focus according to one of three different navigation functions. It is disclosed movement can simultaneously occur in two dimensions using any of the navigational functions if the user selects directions in two dimensions on the four directional control button.

U.S. Pat. No. 5,638,092 to Eng, et al. entitled Cursor Control System, disclose a cursor control system and method for moving a cursor on a computer screen in response to movement of a ring over a keyboard. The ring contains a transmitter circuit which is activated by a switch positioned on the ring. A signal generated by the transmitter circuit is transmitted to a receiver attached to a computer keyboard. The receiver detects motion of the transmitter circuit over the keyboard and, in response, generates signals which are used to control the movement of the cursor on the computer screen.

U.S. Pat. No. 5,701,140 to Rosenberg, et al. entitled Method And Apparatus For Providing A Cursor Control Interface With Force Feedback, disclose a method and apparatus for use with a computer for providing commands to a computer through tracked manual gestures and for providing feedback to the user through forces applied to the interface. It is disclosed a user manipulatable object is coupled to a mechanical linkage which is, in turn, supportable on a fixed surface. The mechanical linkage or the user manipulatable object is tracked by sensors for sensing the location and/or orientation of the object. A multi-processor system architecture is disclosed wherein a host computer system is interfaced with a dedicated microprocessor which is responsive to the output of the sensors and provides the host computer with information derived from the sensors.

U.S. Pat. No. 5,704,037 to Chen entitled Cursor Positioning Device For Computer System, discloses a cursor control device for controlling the movement and positioning of a cursor on a computer including a finger controllable member formed on the cursor positioning device. The cursor on the display is disclosed as being controllable either in X-axis or Y-axis direction by means of sliding the finger controllable member on the device. The cursor positioning device includes a displacement detecting structure for detecting the movement of the finger controllable member, and photo encoder detectors for detecting the operating situation of the X-axis and Y-axis photo encoders which are arranged in 90 degrees phase deference in space. In such an arrangement, it is disclosed the displacement of the finger controllable member in X-axis and Y-axis direction can be detected as coordinate data. The detected coordinate data is transmitted to a control circuit for further processes and then sent to a computer device.

U.S. Pat. No. 5,760,764 to Martinelli entitled Computer Display Cursor Controller With Serial Interface, discloses a controller for controlling a computer display cursor includes an arena having a predefined optical grid. A puck handle is configured to move a puck on the optical grid and to reflect optical signals to the grid regarding the position of the puck on optical grid. The optical grid defines the resolution of the puck movements and positions that can be ascertained. Gratings formed by undulations in transparent walls provide an optical puck position signal in response to the puck position. A processor is coupled to the optical grid and is configured to receive the puck position signal and to generate a cursor position signal.

U.S. Pat. No. 5,808,602 to Sellers entitled Rotary Cursor Positioning Apparatus, discloses a portable computer provided with a rotary display screen cursor position control device that includes a rotatably supported disc member that has radially extending depression formed in an exposed outer side surface thereof. To reposition the display screen cursor, it is disclosed the computer user places a finger in the depression and rotates the disc until the radially outer end of the depression points in a direction corresponding to the desired cursor repositioning movement direction, with the finger being placed at a radial position in the depression corresponding to the cursor repositioning velocity, a radially outer end portion of the depression corresponding to the highest selectable cursor velocity, and a radially inner end portion thereof corresponding to the lowest selectable cursor velocity. It is disclosed position sensing circuitry underlying the rotatable disc senses the rotational orientation of the disc, and the radial position of the user's finger in its depression, and responsively generates an output signal useable to reposition the display screen cursor in the selected direction and at the selected velocity.

U.S. Pat. No. 5,821,922 to Seller entitled Computer Having Video Controlled Cursor System, discloses a cursor control system for a computer includes a small video camera mounted above the keyboard portion of the computer and pivotable to selectively view a central observation zone generally over the keyboard, a horizontally offset observation zone to the left of the keyboard, or a horizontally offset observation zone to the right of the keyboard. The image received by the video camera of a computer user's hand placed within the selected observation zone is transmitted to cursor control circuitry which monitors the presence, configuration and movement of the hand.

U.S. Pat. No. 5,880,714 to Rosenberg, et al. entitled Three-Dimensional Cursor Control Interface With Force Feedback, disclose a method and apparatus for use with a computer for providing commands to a computer through tracked manual gestures and for providing feedback to the user through forces applied to the interface. It is disclosed a user manipulatable object is coupled to a mechanical linkage which is, in turn, supportable on a fixed surface. The mechanical linkage or the user manipulatable object is tracked by sensors for sensing the location and/or orientation of the object. A multi-processor system architecture is disclosed wherein a host computer system is interfaced with a dedicated microprocessor which is responsive to the output of the sensors and provides the host computer with information derived from the sensors.

U.S. Pat. No. 5,914,703 to Ho entitled Cursor Control Device, discloses a cursor control device electrically connected to a computer used for controlling movements of an object within a three-dimensional image displayed over a screen of the computer. It is disclosed the cursor control device includes a housing having a first panel and a second panel perpendicular to each other, a first cursor controller installed on the first panel for generating a first two-dimensional signal, and a second cursor controller installed on the second panel for generating a second two-dimensional signal. It is disclosed the computer program moves the object within a two-dimensional plane formed by the first and second coordinates within the three-dimensional image according to the first two-dimensional signal and moves the object within a two-dimensional plane formed by the second and third coordinates within the three-dimensional image according to the second two-dimensional signal.

U.S. Reissue No. RE032,633 to Hovey, et al. entitled Cursor Control Device, disclose a cursor control device having application to a computer display system includes a unitary frame, having a domed portion substantially surrounding and retaining a ball which is free to rotate. It is disclosed rotation of the ball provides signals indicative of X-Y positions on the display system. X-Y positions are established by movement of the control device over a surface.

SUMMARY OF THE INVENTION

It is therefore an objects among other objects of the present invention to provide an improved control mechanism having a structure capable of hiding a sensing member.

In order to attain the above and the other objects of the present invention, according to an aspect of the present invention, the portable computer having a control mechanism according to the present invention for controlling the position of a cursor on the display screen includes a housing, a frame, a circular bar, a slider, a first mark member, a second mark member, a detecting member and a system unit. The circular bar, coupled to the frame, is capable of rotation and movement longitudinally. The slider is supported by the circular bar to move longitudinally together with the circular bar. The first mark line or member is provided with the circular bar and indicates displacement of the circular bar during rotation of the circular bar. The second mark line or member is provided with the slider and indicates displacement of the slider during linear movement of the slider. The first mark line or member and the second mark line or member are located within the housing. The rotational or longitudinal movements of the circular member and the linear movements of the slider are sensed by the detecting member. The system unit, capable of analyzing the detected displacement, controls a position of a cursor on the display screen of the portable computer. The control mechanism of the present invention is advantageously simple in construction, and can be made at a minimal cost and desirably can have a long operating life.

The control mechanism of the present invention can be constructed in any one of several different embodiments. The control mechanism of the present invention can desirably be of a size so that it requires only a minimum of space. The control mechanism of the present invention can be also used as an accessory for any of various electrical apparatus capable of being controlled by several electrical or other values, such the X and Y positions of a cursor of a portable computer, or for a video game controller, a bass-treble integrated tone controller or a left-right balance-volume control, for example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
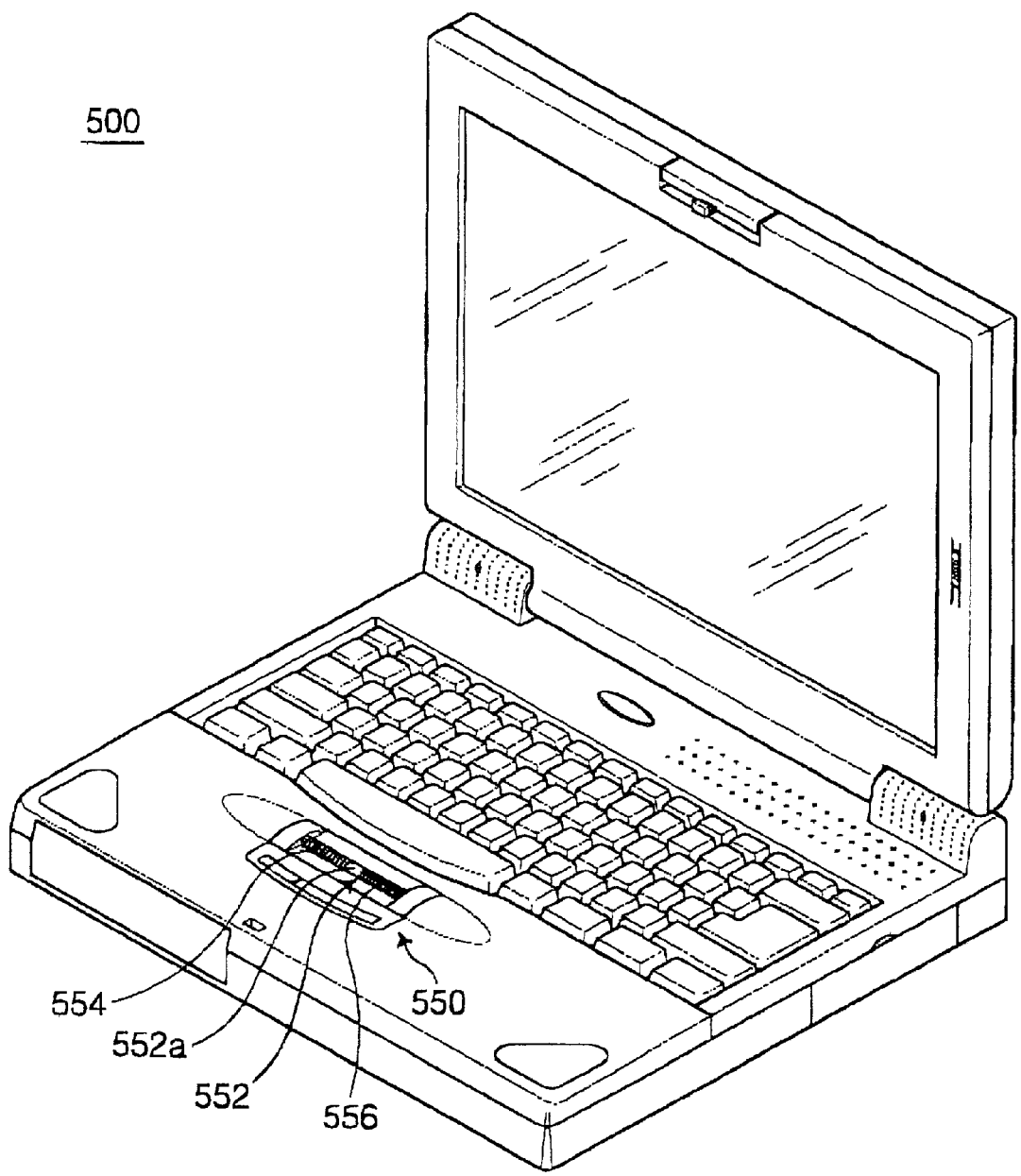
FIG. 1 is a perspective front view showing a portable computer incorporating a control mechanism exemplary of contemporary practice in the art.

FIG. 1 illustrates a portable computer 500 having a control mechanism 550 exemplary of contemporary practice in the art. Referring to FIG. 1, in such a control mechanism 550, control over vertical and horizontal movements of the cursor on a computer display is achieved by the use of a contact portion 552a of a rotatable and freely slidable shaft 552. The shaft 552 is coupled to a support (not shown) so that the shaft 552 can be moved longitudinally or rotationally.

A first analog value is adjusted by rotation of the contact portion 552a in either direction. A second analog value is adjusted by moving the contact portion 552a along the shaft 552 in either direction. Also, the control mechanism 550 can be constructed so that, with a slight downward pressure on the contact portion, an electrical switch can be actuated for enabling a circuit of an apparatus with which the mechanism is associated.

Continuing with reference to FIG. 1, in accordance with the control mechanism 550 exemplary practice in the art, sensing members 554, 556 detecting a movement of the slidable and rotational contact portion 552a, are affixed on the shaft 552. Generally, the sensing members 554, 556 are directly printed on the shaft 552 or on another printed film that is affixed on the shaft 552. For example, a line of the sensing members 554 is provided vertically, and a line of the sensing member 556 is provided horizontally. The movement of shaft 552 causes a position of one or both of the sensing members 554, 556 to change, which produces an analog value about a position of the contact portion 552a. A system unit, located within the portable computer 500, receives the analog value and controls the position of cursor on the display screen. Therefore the sensing members 554, 556 are always exposed to outside, which can result in a low efficiency or failure of control mechanism 550 exemplary of contemporary practice in the art when used.

Figure 2:
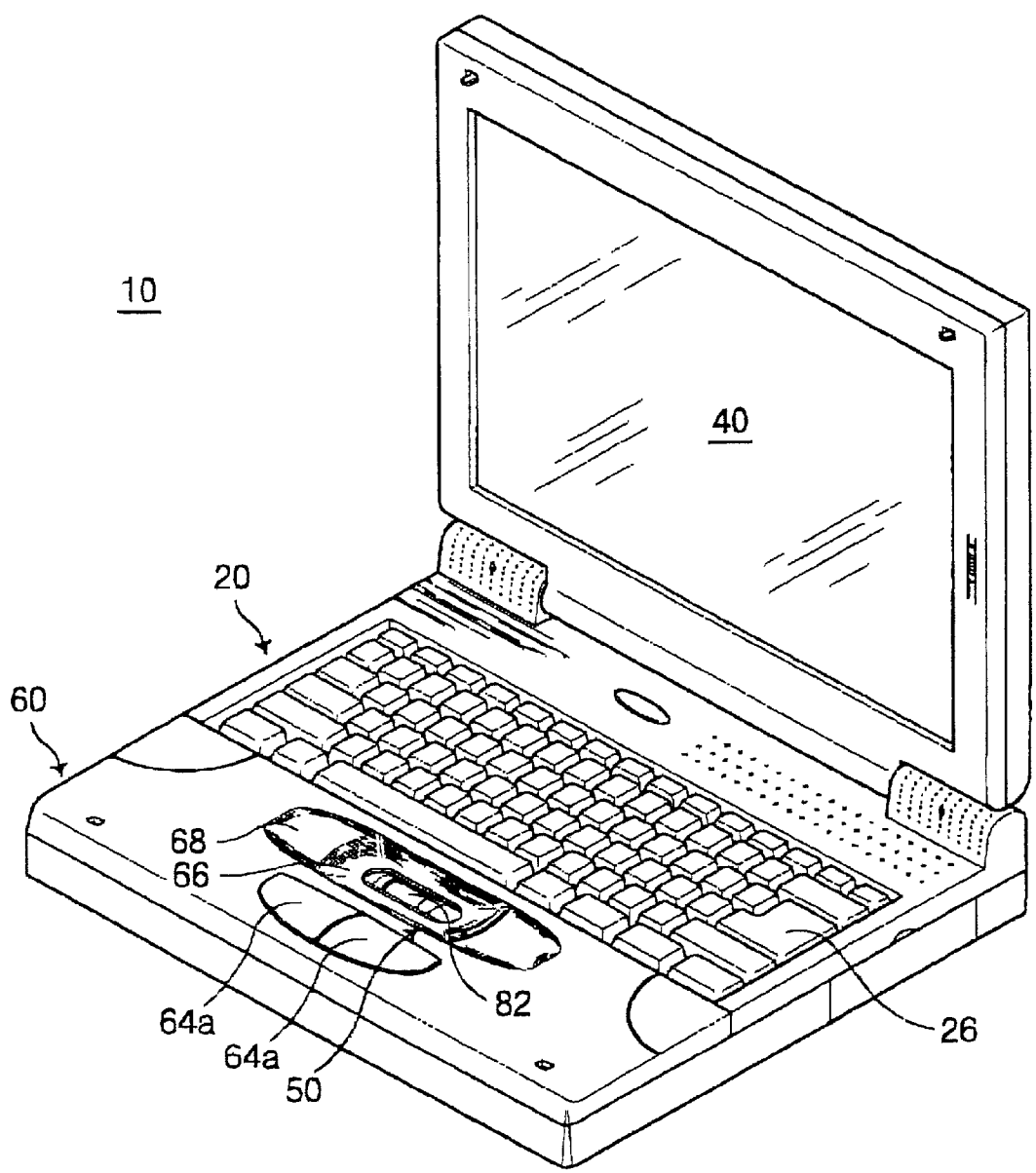
FIG. 2 is a perspective view showing a portable computer incorporating a control mechanism according to the present invention.

A preferred embodiment of a control mechanism 50 according to the present invention is shown in FIGS. 2, 3A, 3B, 3C, and 3D. Control mechanism 50, for purposes of illustration, is shown in FIG. 2 as being used as an accessory with a computer keyboard 26 coupled with a portable computer 10 having a display 40. Control mechanism 50 is located in FIG. 2 adjacent to the keyboard 26, but it could also be located at any location on portable computer 10 which is convenient for a hand of a user of the portable computer 10. In such a position on portable computer 10, control mechanism 50 can be operated by the fingers, thumb or palm of either hand of a user. When operated with the thumb or palm of the hand, the control mechanism 50 advantageously permits the fingers of both hands to be substantially free to manipulate the keys of the keyboard 26 of the portable computer 10.

Figure 3A:
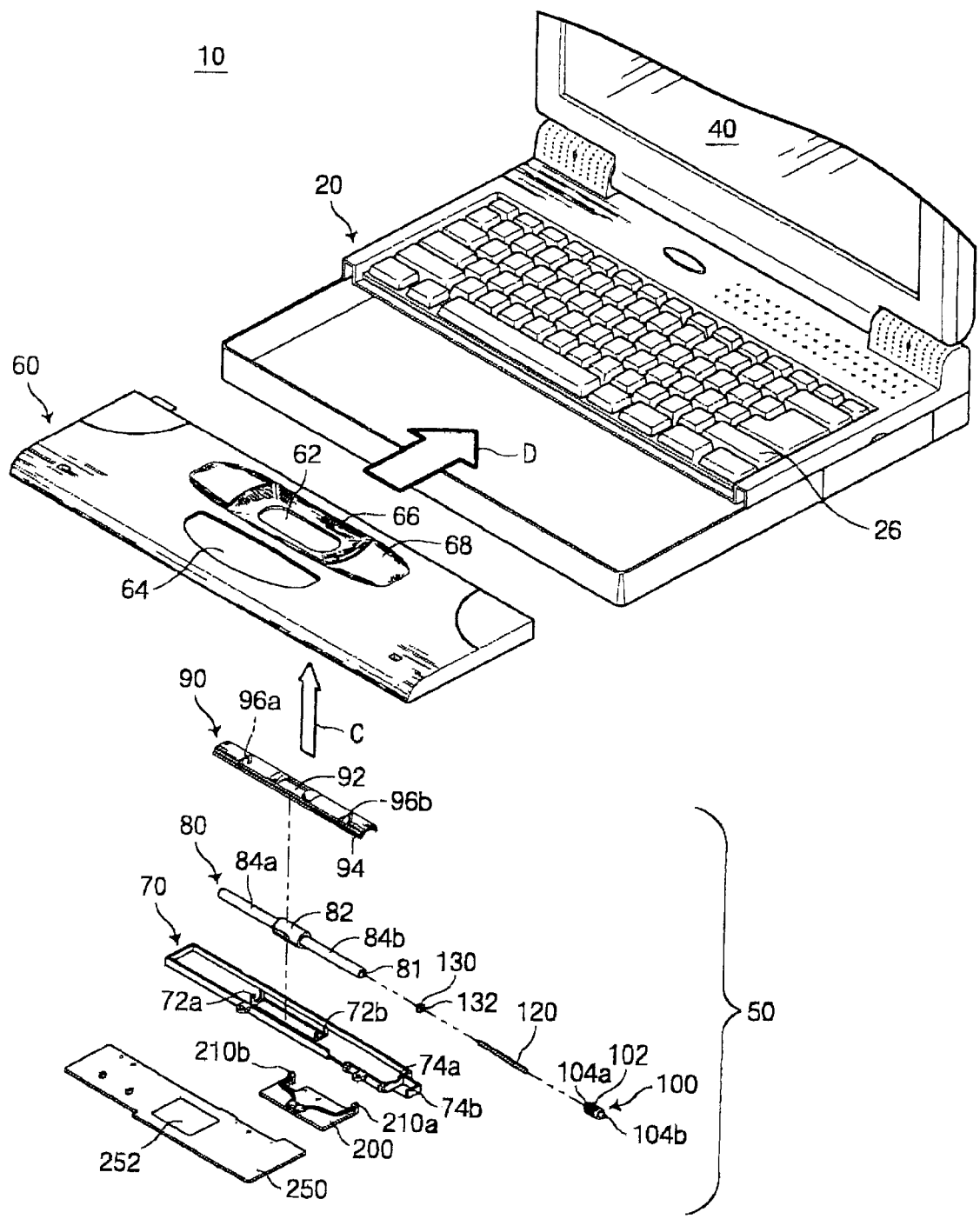
FIG. 3A is a perspective exploded view showing a control mechanism according to the present invention installed in a portable computer.
Figure 3B:
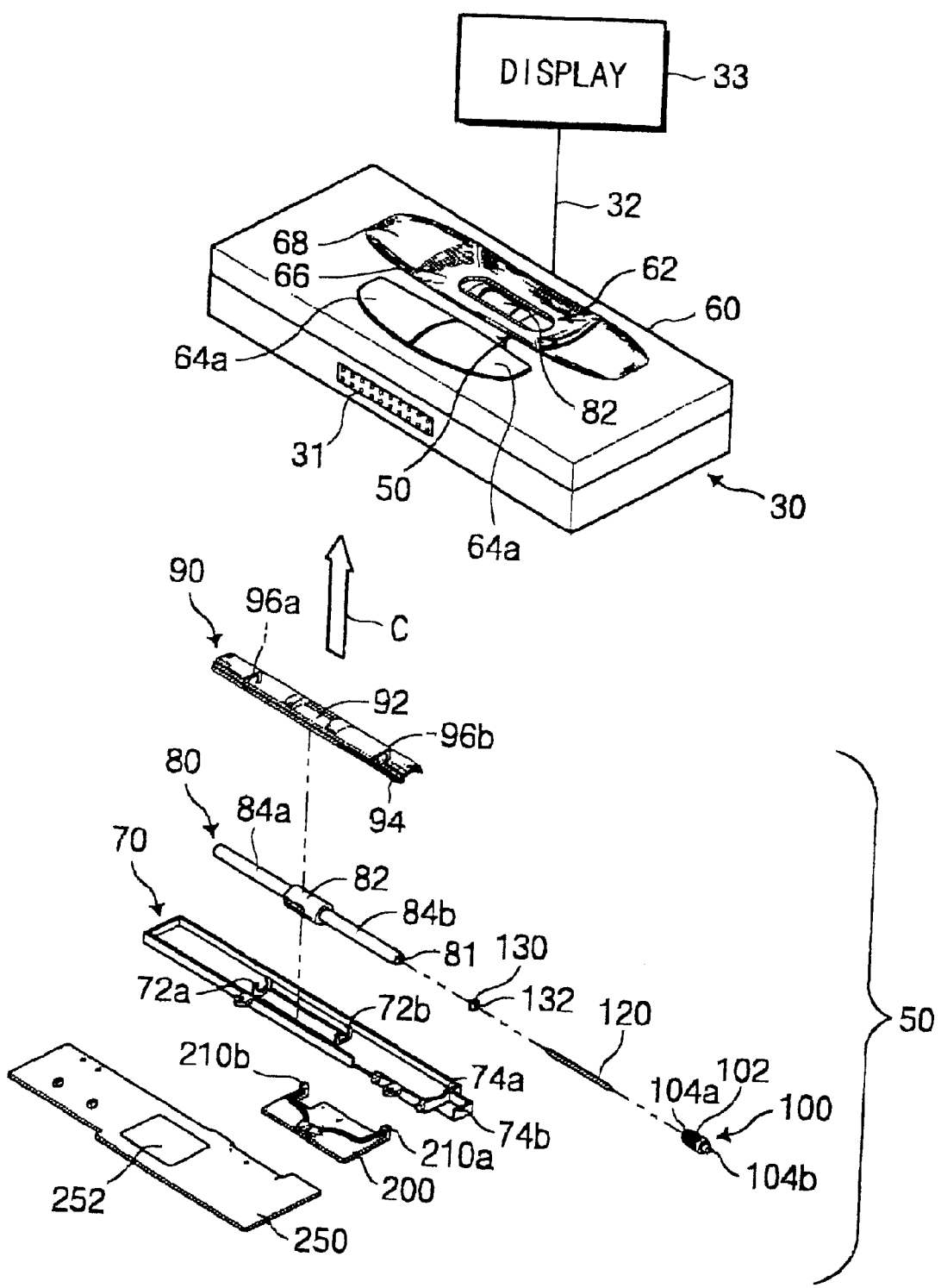
FIG. 3B is a perspective exploded view showing control mechanism according to the present invention installed in a video game controller.
Figure 3C:
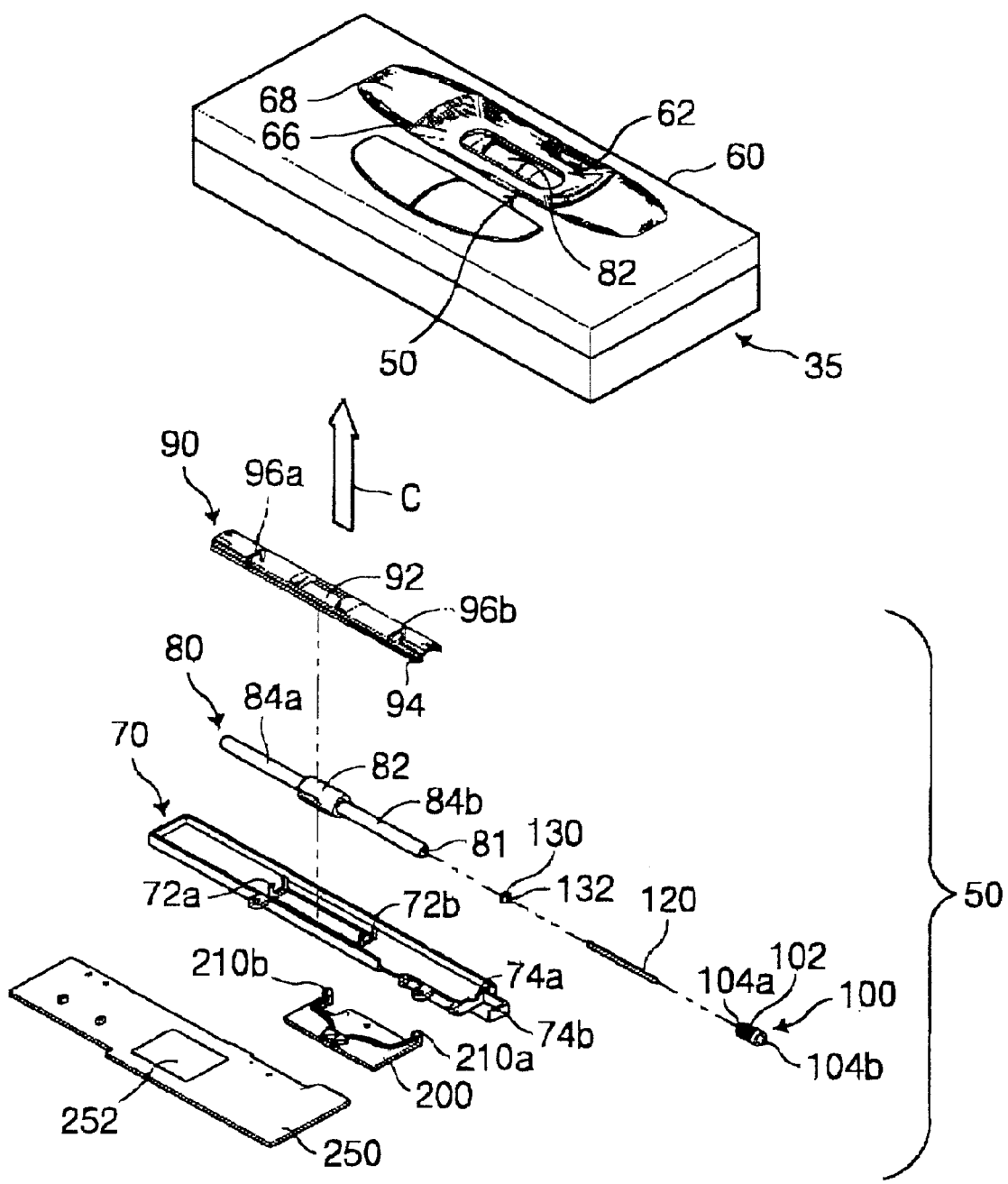
FIG. 3C is a perspective exploded view showing control mechanism according to the present invention installed in a tone or volume controller.
Figure 3D:
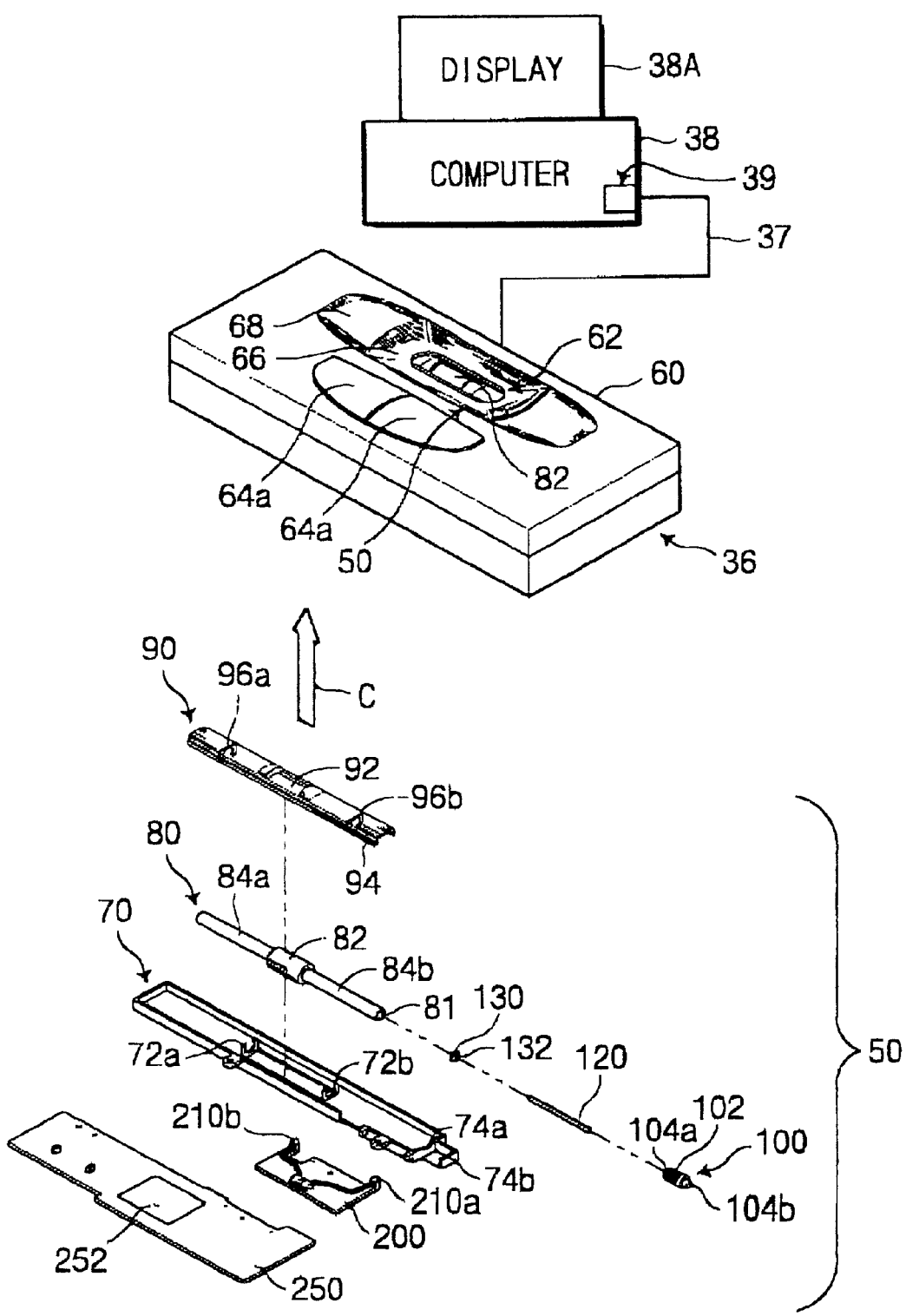
FIG. 3D is a perspective exploded view showing control mechanism according to the present invention for a personal or desk top computer.
Figure 4:
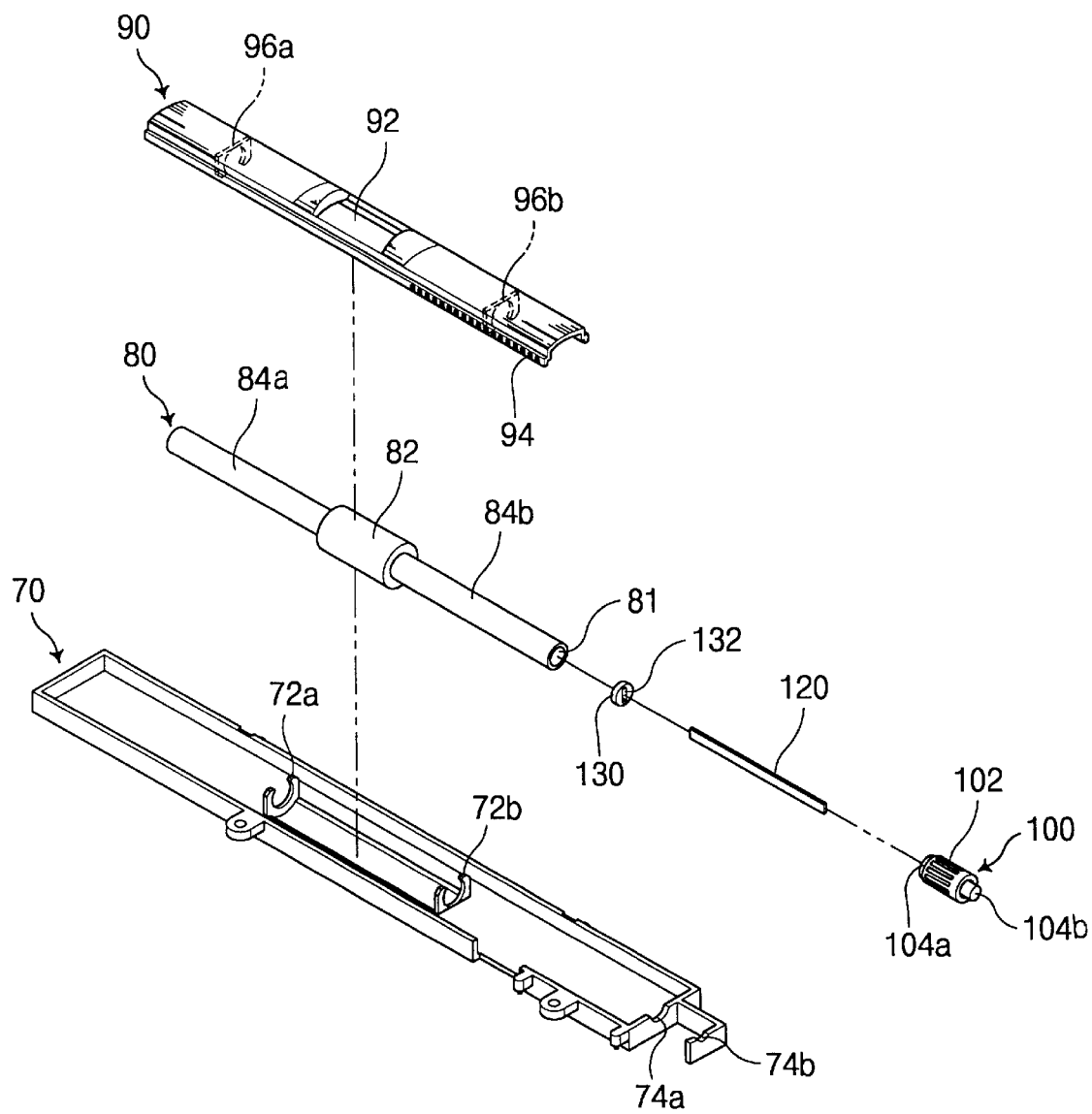
FIG. 4 is a detailed perspective exploded view showing a control mechanism according to the present invention of FIGS. 3A–3D.
Figure 5:
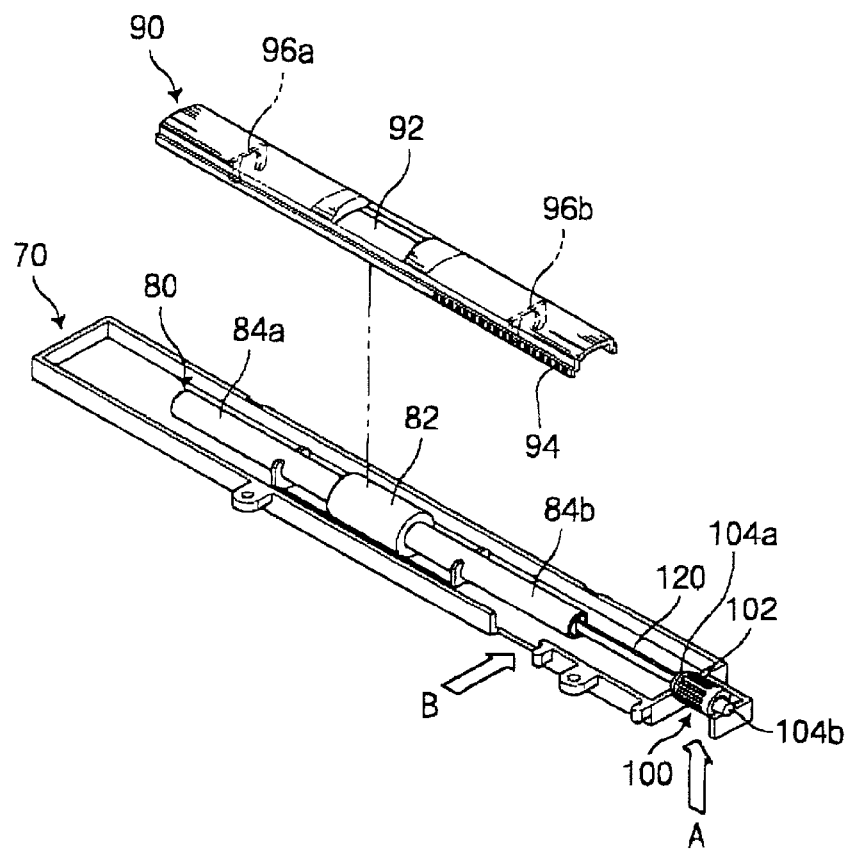
FIG. 5 is a perspective exploded view showing a control mechanism according to the present invention of FIGS. 3A–3D partially assembled.

When used with a computer, such as portable computer 10 of FIG. 2, or desk top or personal computer 38 of FIG. 3D, the control mechanism 50 will typically be coupled to the mouse inputs of the computer, such as mouse input 39 of computer 38 of FIG. 3D. However, the present invention including control mechanism 50 can be used as a means to control variable or analog values associated with other types of apparatus, such as a video game controller of FIG. 3B, a bass-treble integrated tone controller or a left-right balance-volume control of FIG. 3C.

For example, FIG. 3B illustrates control mechanism 50 as used in video game controller 30. Video game controller 30 has a housing 60 including control mechanism 50, with video game controller 30 having a video game receiving portion 31 and being connected to a display 33 for receiving the video game by a connecting cable 32. FIG. 3C illustrates control mechanism 50 as used in a bass-treble integrated tone controller 35 or left-right balance-volume control 35, the controller 35 having a housing 60 including control mechanism 50. Also, for example, FIG. 3D illustrates control mechanism 50 as used in a controller 36 for a personal or desk top computer 38. The controller 36 has a housing 60 including the control mechanism 50. The controller 36, similar to a mouse, is connected to the personal or desk top computer 38 by cable 37 at mouse input 39, such as for moving a cursor on display 38A for computer 38.

Control mechanism 50 provides a precise and convenient means for adjustment of two related or distinct analog, electrical or other values or parameters. For example, when coupled with the mouse inputs of portable computer 10 or of computer 38, control mechanism 50 operates as a mouse for controlling the positions and movements of a mouse-driven pointer or cursor on the display of the computer. The way in which the signals are adjusted by use of control mechanism 50 to cause the cursor to move in an X-Y plane on the display will be set forth hereinafter. Also, for example, control mechanism 50 of video game controller 30 of FIG. 3B operates to control movements of an object or pointer on the display 33 by adjustment of signals, such as position signals for the object or pointer, using control mechanism 50. Similarly, control mechanism 50 of the tune or balance controller 35 of FIG. 3C operates to control the left-right balance or bass-treble tone of a sound system into which the tone or balance controller 35 is integrated or connected, such as a sound system or personal stereo system with the left-right balance signals or bass-treble signals being adjusted by the control mechanism 50.

Referring to FIGS. 2 through 3D, control mechanism 50 is illustrated in an exploded perspective view as used in the portable computer 10 (FIGS. 2 and 3A), the video game controller 30 (FIG. 3B), the tone or balance controller 35 (FIG. 3C) and the controller 36 for personal or desk top computer 38 having display 38A (FIG. 3D). The arrows C in FIGS. 3A through 3D indicate the assembly direction and general location of control mechanism 50 in housing 60. The arrow D in FIG. 3A indicates the assembly direction of housing 60 in portable computer 10. Control mechanism 50, located inside of housing 60, which is included in the base 20 of portable computer 10 of FIG. 2, includes a frame 70, a bar 80 and a slider 90. Control mechanism 50 further includes a detector or sense assembly 200 and a printed circuit board 250. The detector or sense assembly 200 includes light emitting diodes (LEDs) or photo transistors 210a and 210b, for example, as detectors for producing and transmitting a detecting signal to circuit board 250, circuit board 250 including a system unit 252, such as a processor or microprocessor, for analyzing the detecting signal from detector 200 and producing a control signal or control signals to control the variable electrical or analog values or parameters. The housing 60 has a recess 62 and, depending on the use, can have a button aperture or hole 64 for receiving a command button or buttons 64a (FIGS. 2, 3B, 3D), with housing 60 being constructed in any one of several different embodiments depending upon the use or application. Through the recess 62, the bar 80 and the slider 90 are exposed outside to contact with a finger of a hand of a user to move rotationally or longitudinally. In the button hole 64, button 64a is provided to produce a command, if pushed by a user. For example, when using a button 64a, such as a command execution button, the user first of all moves the bar 80 of control mechanism 50 to place the cursor at a desired point, such as of a computer display or a display for a video game controller, and then the user pushes the button 64a to execute a command. For example, also, in control mechanism 50 the height of an adjacent portion 66 of the recess 62 relative to control mechanism 50 desirably is relatively low, such as for a computer user to contact easily the bar 80 and the slider 90, and the height of a distant portion 68 of the recess 62 is relatively high relative to control mechanism 50 for the bar 80 and the slider 90 to slide smoothly.

Continuing, with reference to FIGS. 4 through 8, as well as FIGS. 2 through 3D, the construction and operation of control mechanism 50 of the present invention will be further described. Referring to FIGS. 4 through 8, the frame 70 is secured, such as by a screw 61 or screws 61 to an inner wall 60a of the housing 60, and supports 72a and 72b are formed inside of the frame 70 to support the bar 80. The bar 80 includes a handle 82 and shafts 84a and 84b respectively on both sides of the handle 82. The handle 82 can be a single body integrated with shafts 84a and 84b or a separate one with the shafts 84a and 84b. The shaft 84a is coupled to support 72a and the shaft 84b is coupled to support 72b. The bar 80 thus can move longitudinally and be rotatable. The handle 82 and the shafts 84a and 84b are provided with a circular cross section. In a preferred embodiment, the shafts 84a and 84b are desirably each a hollow tube having an aperture 81 and the handle 82 and the shafts 84a and 84b having the same center of rotation. A guide 130 is engaged to one end of shaft 84b, the guide 130 having a rectangular-shaped aperture 132. One end of the connecting rod 120, provided with a rectangular cross section, is coupled to the aperture 132 provided with the same cross section to move longitudinally, and the other end of the connecting rod 120 is coupled to an aperture formed in a projection 104a at one end of a roller 100. The roller 100 has two projections, the projection 104a at one end and a projection 104b at the other end, the projections 104a and 104b being provided with a circular cross section at each end. The projection 104a is coupled to groove 74a, and the projection 104b is engaged to groove 74b.

Continuing with reference to FIGS. 4 through 8, a mark line or mark member 102 of a y-axis change or a of change of a corresponding variable or parameter is affixed in the outer circumference of the roller 100. As clearly shown in FIG. 5, for example, owing to the coupling of the bar 80 and the roller 100, the rotation of the handle 82 is simultaneously transmitted to the roller 100 through the connecting rod 120, resulting in the same rotational movement of the roller 100. Thus, the displacement of the mark line or mark member 102 of the rotation of roller 100 in the open space shown by a headed arrow A is detected by the detector or sense assembly 200. The detector or sense assembly 200 can detect the displacement of mark line 102, such as of y-axis change or a variable or parameter change, by light emitting diode (LED) or photo transistor 210a and transmit the detecting signal to the printed circuit board 250 to system unit 252 through a coupling link or point 240 (FIG. 7) of printed circuit board 250 that connects or couples the detector or sense assembly 200 to system unit 252. The printed circuit board 250 having the system unit 252 analyzes the signal from detector or sense assembly 200 and controls the pointer or cursor on a display screen, such as display 40 of FIGS. 2 and 3A, the display 33 of FIG. 3B or display 38A of FIG. 3D, or controls the corresponding variable or parameter, such as treble or base tone or left or right volume as in FIG. 3C. In this way, the rotational or turning movement of the handle 82 changes a y-axis position of a cursor of the display screen or changes a value of a corresponding variable or parameter.

Figure 6:
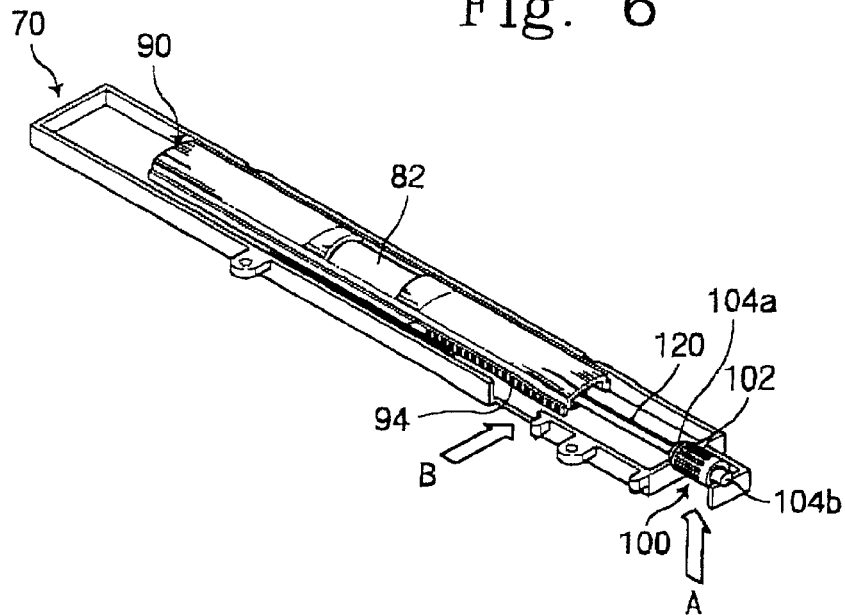
FIG. 6 is a perspective view showing a control mechanism according to the present invention of FIGS. 3A–3D totally assembled.
Figure 7:
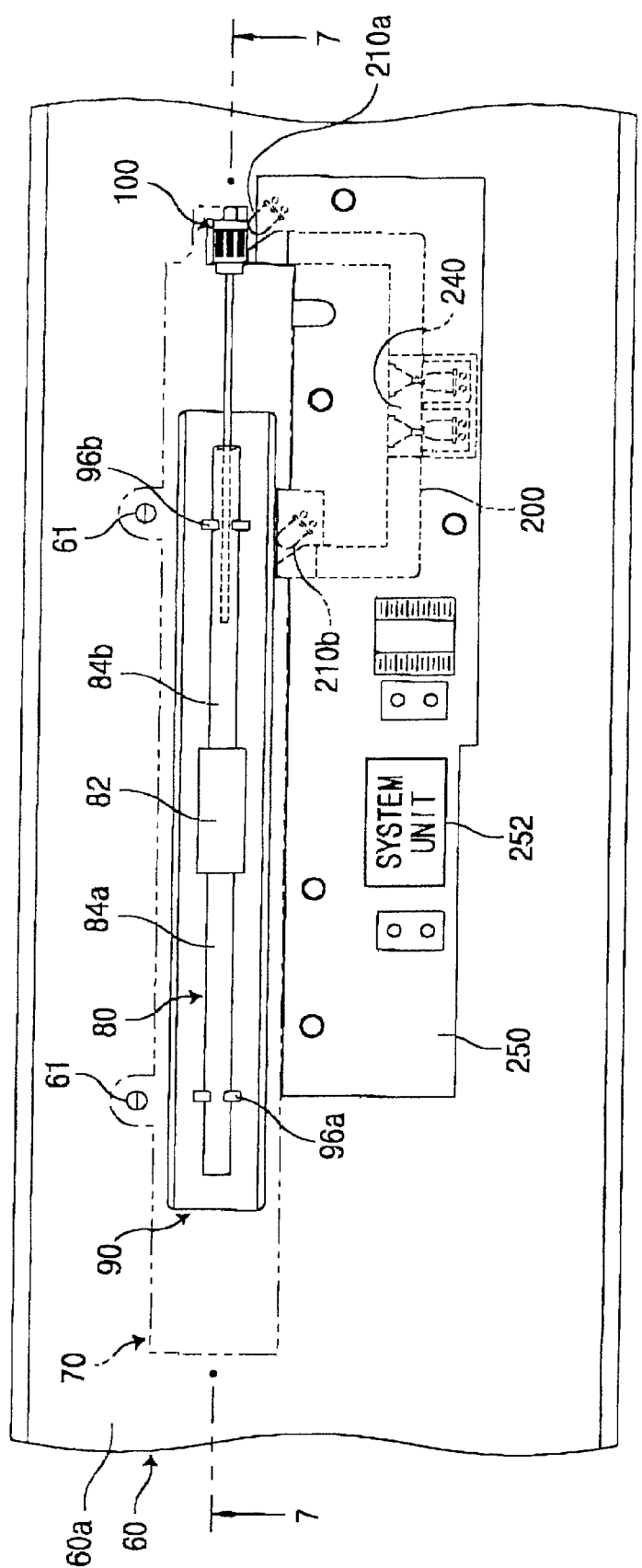
FIG. 7 is a plan view showing a control mechanism according to the present invention installed in a portable computer of FIG. 3A, a video game controller of FIG. 3B, a tone or volume controller of FIG. 3C and a controller for a personal computer of FIG. 3D.
Figure 8:
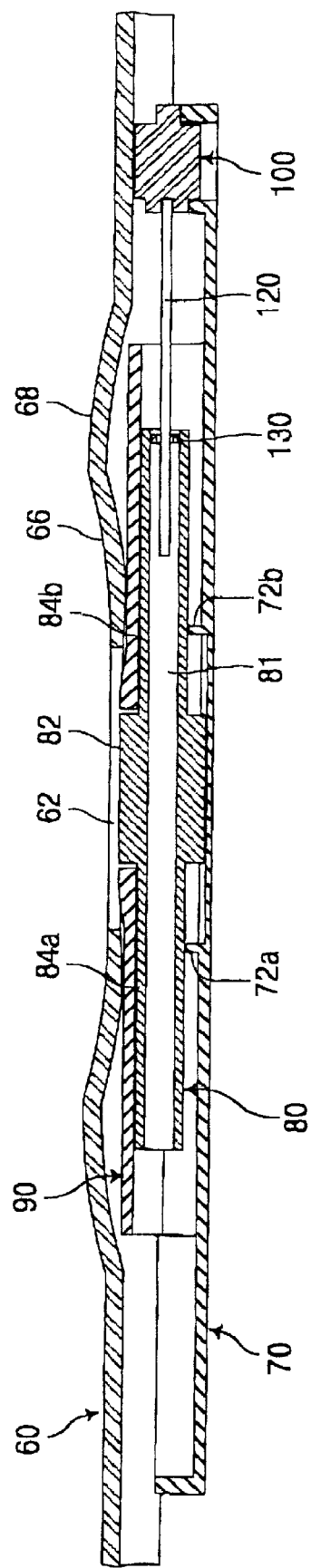
FIG. 8 is a cross-sectional view taken along line 7—7 of FIG. 7 of the control mechanism according to the present invention.

Continuing with reference to FIGS. 4 through 8, as clearly shown in FIG. 6, the slider 90, supported by the bar 80, is located between the housing 60 and the bar 80 (FIGS. 2—3D). The slider 90 has supports 96a and 96b, which mount on the bar 80 to move together with the bar 80. The recess 92, formed in the slider 90, is located on the same line of the recess 62 of the housing 60. Therefore, the handle 82 of the bar 80 is revealed through the recess 92. The slider 90 also has mark line or a mark member 94 of an x-axis change or of a change of a value of a corresponding variable or parameter located at one side of slider 90. The displacement of the mark line or mark member 94 of the movement of slider 90 in the open space shown by a headed arrow B (FIGS. 5 and 6) is detected by the detector or sense assembly 200. The detector or sense assembly 200 can detect the displacement of mark line or mark member 94, such as of an x-axis change of a variable or a parameter change, by light emitting diode (LED) or photo transistor 210b and transmit the detecting signal to the printed circuit board 250 through a coupling link or point 240 (FIG. 7) of printed circuit board 250 that connects or couples the detector or sensing unit 200 to system unit 252. The printed circuit board 250 having the system unit 252 analyzes the signal from detector or sense assembly 200 and controls the pointer or cursor on a display screen, such as display 40 of FIGS. 2 and 3A, the display 33 of FIG. 3B or display 38A of FIG. 3D, or controls the corresponding variable or parameter, such as treble or base tone or left or right volume as in FIG. 3C. In this way, the linear or longitudinal movement of the handle 82 changes an x-axis position of a cursor of the display screen or changes a value of a corresponding variable or parameter.

Therefore, the control mechanism 50, such as when used with a portable computer 10 of FIGS. 2 and 3A or with computer 38 having display 38A of FIG. 3D, for moving the cursor on the display 40 or display 38A in an X direction, the handle 82 is moved linearly or longitudinally, and for moving the cursor on the display 40 or display 38A in a Y direction, the handle 82 is rotated. Further, both linear movements of slider 90 and rotational movements of the handle 82 can be done simultaneously to provide rectilinear type movement so as to move the cursor on the computer display in a diagonal direction, or to simultaneously adjust respective values of two variables or two parameters with control mechanism 50, such as when adjusting bass-treble tone or left-right balance-volume.

In accordance with the present invention, because mark line or mark member 102 to indicate the position of the handle 82 and mark line or mark member 94 to indicate the position of slider 90 are respectively located within the housing 60, the structure or shape of an exposed portion of the bar 80, handle 82 and slider 90 can be more freely designed. Furthermore, the location of the mark line or mark members 94 and 102 within the housing 60 advantageously promotes minimizing damage of the mark line or mark member, resulting in promoting a long operating life of a controlling mechanism, such as controlling mechanism 50, of the present invention.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A control mechanism for controlling a position of a cursor on a display screen for a computer, comprising:
    a housing including a recess on one side of said housing;
    a frame positioned within said housing;
    a bar supported by said frame and positioned between said frame and said housing, said bar being rotatively moveable and linearly moveable within said recess of said housing;
    a slider supported by said bar and positioned between said housing and said bar, said slider being linearly moveable with said bar;
    a first mark member coupled to said bar for indicating displacement of said bar during rotation of said bar;
    a second mark member provided on said slider for indicating displacement of said slider during linear movement of said slider, said second mark member including a plurality of lines located to one side of said slider, said plurality of lines of said second mark member being formed vertically relative to a direction of movement of said slider;
    a detector for detecting displacement of said first mark member and displacement of said second mark member and for producing a detecting signal indicating said displacement of said first mark member and a detecting signal indicating said displacement of said second mark member; and
    a system unit for analyzing each detecting signal received from said detector to control a position of said cursor on said display screen of said computer.

2. The control mechanism of claim 1, further comprised of said first mark member including a roller coupled to one side of said bar and provided with a plurality of lines on an outer circumference of said roller, said plurality of lines provided on said roller being parallel with said bar.

3. The control mechanism of claim 1, further comprised of said first mark member and said second mark member being positioned within said housing.

4. The control mechanism of claim 1, further comprised of said bar including a handle positioned on said bar for moving said bar.

5. The control mechanism of claim 4, further comprised of said slider including a recess for receiving said handle of said bar.

6. The control mechanism of claim 5, further comprised of said first mark member including a roller coupled to one side of said bar and provided with a plurality of lines on an outer circumference of said roller, said plurality of lines provided on said roller being parallel with said bar.

7. A control mechanism, comprising:
    a housing including a recess on one side of said housing;
    a frame positioned within said housing;
    a bar supported by said frame and positioned between said frame and said housing, said bar being rotatively moveable and linearly moveable within said recess of said housing;
    a slider supported by said bar and positioned between said housing and said bar, said slider being linearly moveable with said bar;
    a first mark member coupled to said bar for indicating displacement of said bar during rotation of said bar, said displacement of said bar corresponding to a value for a first parameter;
    a second mark member provided on said slider for indicating displacement of said slider during linear movement of said slider, said displacement of said slider corresponding to a value for a second parameter, and said second mark member including a plurality of lines located to one side of said slider, said plurality of lines of said second mark member being formed vertically relative to a direction of movement of said slider;
    a detector for detecting displacement of said first mark member and displacement said second mark member and for producing a detecting signal indicating said displacement of said first mark member and a detecting signal indicating said displacement of said second mark member; and
    a system unit for analyzing each detecting signal received from said detector to control said first parameter and said second parameter.

8. The control mechanism of claim 7, further comprised of said first mark member and said second mark member being positioned within said housing.

9. The control mechanism of claim 7, further comprised of said bar including a handle positioned on said bar for moving said bar.

10. The control mechanism of claim 9, further comprised of said slider including a recess for receiving said handle of said bar.

11. A control mechanism, comprising:

a frame;

a bar supported by said frame, said bar being rotatively moveable and linearly moveable;

a slider supported by said bar, said slider being linearly moveable with said bar;

a first mark member coupled to said bar for indicating displacement of said bar during rotation of said bar, said displacement of said bar corresponding to a value for a first parameter;

a second mark member provided on said slider for indicating displacement of said slider during linear movement of said slider, said displacement of said slider corresponding to a value for a second parameter, and said second mark member including a plurality of lines located to one side of said slider, said plurality of lines of said second mark member being formed vertically relative to a direction of movement of said slider;

a detector for detecting displacement of said first mark member and displacement of said second mark member and for producing a detecting signal indicating said displacement of said first mark member and a detecting signal indicating said displacement of said second mark member; and a system unit for analyzing each detecting signal received from said detector to control said first parameter and said second parameter.

12. The control mechanism of claim 11, further comprised of said first mark member including a roller coupled to one side of said bar and provided with a plurality of lines on an outer circumference of said roller, said plurality of lines provided on said roller being parallel with said bar.

13. The control mechanism of claim 11, further comprised of said control mechanism controlling a position of a cursor on a display screen of a computer.

14. The control mechanism of claim 11, further comprised of said control mechanism controlling a position of an object on a display screen.

15. The control mechanism of claim 11, further comprised of said control mechanism comprising a video game controller, and said first parameter and said second parameter for controlling a position of an object on a display screen.

16. The control mechanism of claim 11, further comprised of said control mechanism comprising a bass-treble integrated tone controller, and said first parameter and said second parameter each respectively controlling one of a bass tone and a treble tone.

17. The control mechanism of claim 11, further comprised of said control mechanism comprising a left-right balance-volume control, and said first parameter and said second parameter each respectively adjusting one of a right balance and a left balance.

* * * * *